Oct. 28, 1969 C. G. AUSTIN, JR., ETAL Re. 26,699

CARTON FORMING MANDREL

Original Filed Aug. 9, 1965

CLARENCE G. AUSTIN, JR.
HOWARD R. GARRETT
*INVENTORS.*

BY Edward L. Bell

ATTORNEY

United States Patent Office

Re. 26,699
Reissued Oct. 28, 1969

26,699

CARTON FORMING MANDREL

Clarence G. Austin, Jr., Scottsdale, Ariz., and Howard R. Garrett, St. Paul, Minn., assignors, by mesne assignments, to Haskon, Inc., Wilmington, Del., a corporation of Delaware Original No. 3,377,928, dated Apr. 16, 1968, Ser. No. 478,111, Aug. 9, 1965. Application for reissue Sept. 23, 1968, Ser. No. 777,537

Int. Cl. B31b *1/26*

U.S. Cl. 93—59 13 Claims

Matter enclosed in heavy brackets [ ] appears in the original patent but forms no part of this reissue specification; matter printed in italics indicates the additions made by reissue.

ABSTRACT OF THE DISCLOSURE

The mandrel is designed to accommodate a plurality of sizes of cartons and is particularly adaptable for use in the milk industry with varying sized milk cartons. The mandrel includes an elongated body which is generally cruciform in shape and has a base plate in one extremity and provision for mounting a removable end cap at the other. On the extent of the body is mounted a sleeve member formed of two symmetrical halves, the sleeve member having shoulder portions of various cross sections designed to correspond with varying sized removable end caps to hold and form varying sized cartons. The sleeve is slidable on the elongated body and the end cap is held in position by means of frictional engagement with a rubber mounting ring positioned in the end of the body.

This invention relates to carton forming apparatus used in carton forming machinery and more particularly to an improved mandrel construction upon which carton blanks are to be formed by carton forming machinery and which is particularly adaptable for use with all sizes of paper cartons used in the milk industry.

In prior carton forming machines, the mandrel for forming the cartons have normally been of a single size and the machinery was limited to forming of a single size of carton. Where the machinery was designed to accommodate various sized cartons, separate mandrels for the various sizes were used and the individual mandrel structures had to be removed and replaced to correct the machinery for different sizes of cartons. The physical size of the mandrels, the difficulty required in replacing or modifying them, the complexity of the machinery which was required when different mandrel sizes were incorporated into the same machine have all [lead] *led* to the expense and difficulty in usage of such prior devices. In addition, the mandrels have not been easily cleaned, thereby increasing the maintenance costs for the machines. Further, in the construction of prior mandrels, the designs have resulted in substantially large masses so as to retain heat from the carton forming operation and have generally resulted in decreased capacity in the carton forming operation because of the cooling requirements for the same.

In the present invention, an improved carton forming apparatus or mandrel is disclosed having simplified construction which is adjustable for the various sized cartons used in the milk industry. The improved mandrel construction may be incorporated into a carton forming machine and utilized in connection with the forming of the various sized cartons with a minimum of change over to increase the versatility of such machinery. Further, the improved mandrel construction is readily maintainable and may be readily disassembled for cleaning. In addition, the mandrel construction is smaller in mass and lighter in weight than prior designs so as to retain a minimum amount of heat in the carton forming operation to permit an increased speed of operation for the machinery. In addition, the improved mandrel construction permits forming of the bottom of a carton in a conventional manner and a conditioning or breaking of the top flaps of a milk carton preparatory for use on the filling and sealing machine through a simplified construction.

It is therefore the principal object of this invention to provide an improved mandrel design for a carton forming machine.

Another object of this invention is to provide an improved mandrel design which may be used in the forming of various sized cartons with a minimum of change over and additional parts.

Another object of this invention is to provide an improved mandrel construction requiring a minimum of adjustment in the change over for varying sized cartons.

A still further object of this invention is to provide a simplified mandrel design which may be readily cleaned and maintained.

Another object of this invention is to provide an improved mandrel design which is lightweight in construction, low in cost and upon which all carton forming functions may take place.

These and other objects of this invention will become apparent from a reading of the attached description together with the drawings wherein.

Figure 2:
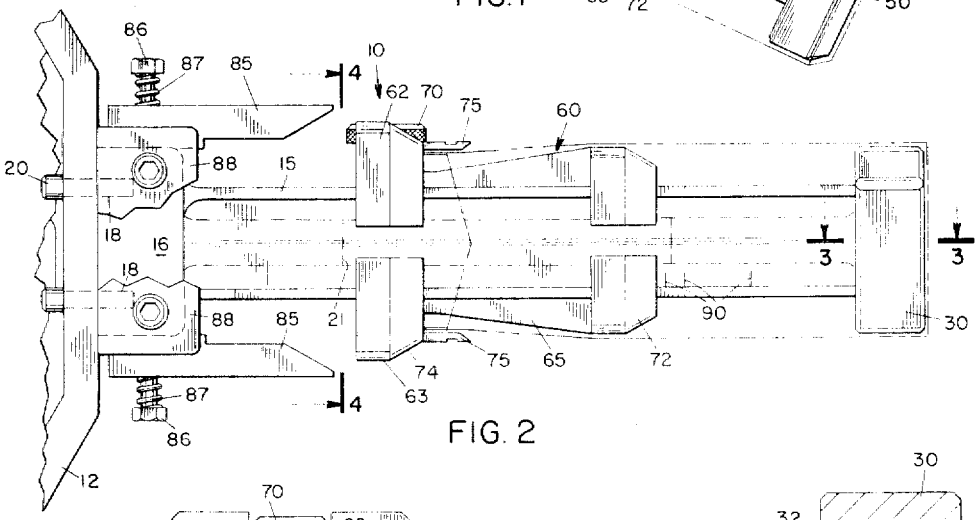
FIGURE 2 is a side elevation view of the carton forming mandrel of FIGURE 1, *adjusted to receive cartons of a different cross-section,*
Figure 4:
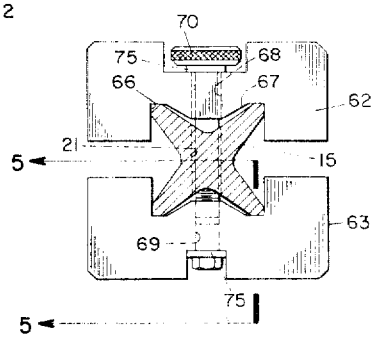
Figure 3:
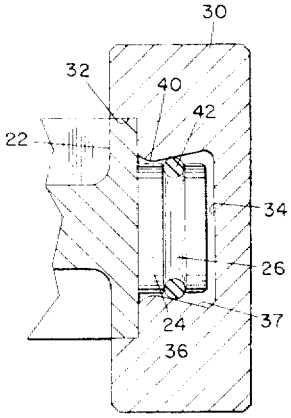
Figure 5:
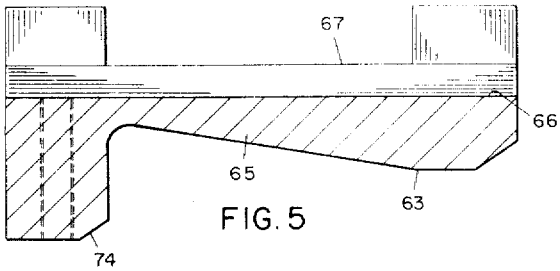

FIGURE 3 is a sectional view of a portion of the mandrel shown in FIGURE 2 taken along the lines 3—3 therein, FIGURE 4 is a sectional view of the mandrel of FIGURE 2 taken along the lines 4—4 therein, and FIGURE 5 is a sectional view of a portion of the mandrel taken along the lines 5—5 therein in FIGURE 4.

Figure 1:
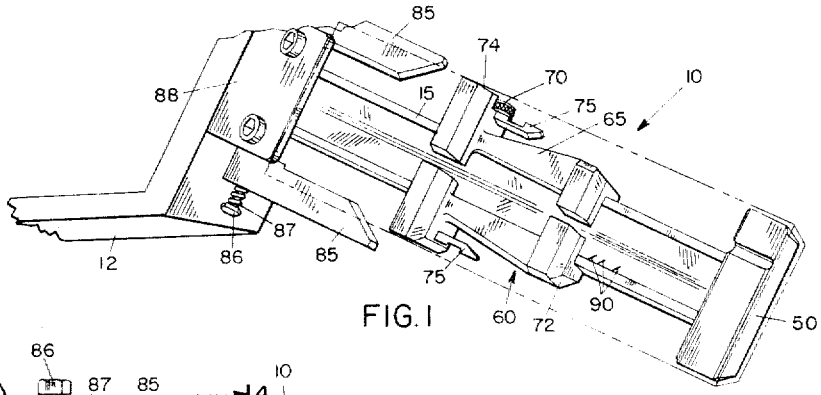
FIGURE 1 is a perspective view of the improved carton forming mandrel, *adjusted to receive cartons of one cross-section,*

The improved mandrel for a carton forming machine is shown in perspective in FIGURE 1 at 10 and is mounted on a support member or base 12 which may be a flat turntable type structure or a polygonal type surface of a spindle to be rotated relative to work stations in a carton forming machine. The improved mandrel is comprised of an elongated body 15 having a base portion 16 which is generally square in cross-section with tapped mounting holes 18 in the end thereof through which suitable mounting means 20, such as bolts, will thread to secure the same to a base member. As will be seen in the drawings, the elongated body 15 has grooved surfaces along its extent to give it a generally cruciform cross-sectional shape with a slot 21 milled or machined in the same and extending between opposed surfaces for purposes to be later noted. The opposite extremity of the elongated body 15 from the base 16 has a square end flange 22 and a cylindrical tip portion 24 with a recess or groove 26 therein. The reduced or grooved surfaces along the extent of the body 15 substantially reduces the mass of the same to reduce the effect of heating and to provide a better radiating surface. Further, the cruciform shape or ribbed surfaces provide sufficient rigidity and strength to withstand the pressing action in a carton forming operation and, as will be later noted, will serve as a guide for the cooperating and movable parts thereon. The cylindrical end portion 24 of the body mounts an end cap, indicated at 30, which is square in cross-section and has a squared recess 32 therein of the same dimension as the end flange 22 on the end of the body. Beyond the squared recess 32 which serves to align the end cap with the extent of the body 15 is a cylindrical recess 34 having tapered surfaces 36, 37 therein defining an annular ridge 40. The cylindrical tip portion 24 and the diametrical dimension of the ridge 40 are such as to provide for clearance to position the end cap on the end of the body 15 with limited clearance therebetween. An annular sealing [of] *or* friction ring 42 of rubber or other compressible material is positioned in the groove 26 in the tip 24 which ring will be deformed as the end cap is positioned on the end of the body 15 and will expand and be located beyond the rib 40 in the recess to frictionally engage and hold the end cap 30 on the body 15 of the mandrel.

As will be noted in FIGURES 1 and 2, the mandrel is adapted to mount varying sized end caps [or] corresponding with the cross-sectional area of various sizes or capacity cartons to be formed thereon. The improved mandrel design is preferably used in the forming of plastic coated paper milk cartons of the type shown in the Egleston et al. Patent 3,120,335 dated Feb. 4, 1964, and entitled, Container With Infolded Bottom Closure. This carton is made in various volumetric sizes from half pint through the quart which utilize the same cross-sectional dimension and vary only in height of carton. Further, increased volumetric sizes of half gallon and gallon in both the English and metric system use the same cross-sectional dimension respectively and vary only in height. Thus with the improved carton forming mandrel, several end plates and corresponding sleeve structures, as will be later noted, to accommodate these varying cross-sections of cartons will be utilized for a single mandrel construction in a carton forming operation which will handle all sized cartons. In the carton forming operation, flat carton blanks are positioned on the mandrels and the cross-sectional dimension of the end plate and the shoulder flange on a sleeve structure, indicated generally at 60, will be such as to snugly fit the carton blank thereon. The blanks are positioned on the mandrels in such a manner that the folded in flaps and end flaps for the top and bottom of the carton project beyond the end surfaces of the sleeve structure and the end cap such that the carton blanks may be creased or folded against the end of the mandrel in the forming of the bottom of the carton. In the carton forming machinery, these [carton] plastic coated paper cartons are then heated in the area of the end or bottom flap, the flaps are thereafter folded on one another and a press is applied against the face of the end cap with the folded flaps therebetween to seal the base of the carton. The shoulder portion on the sleeve aids in the positioning of the carton on the mandrel to insure accurate location of the same during the folding and sealing operation of the bottom flaps.

The sleeve structure 60 is formed of a pair of parts or halves 62, 63 which are substantially identical in form. Each of the parts has enlarged flange sections at the extremities thereof which combine to form a generally square outline of the same cross-sectional dimension as one of the end caps mounted on the cylindrical section 24. In the sleeve structure, the flanged extremities of the same are separated by a recessed or tapered portion 65 offset from the end of the smaller flange such that a carton blank may be creased along the same. The inner surface of the halves are recessed as at 66 and include a projecting rib 67 which fits into the notched surfaces of the cruciform shaped body member 15. In the larger of the flange sections, an aperture is provided in one of the halves, as at 68, and a tapped hole 69 in the other such that a bolt member 70 may be positioned through the halves and through the slot 21 in the body to clamp the halves in assembled relationship on the body of the mandrel. The ribs 67 will insure accurate positioning of the halves on the body of the mandrel and the outer edges of the recess will align with the ends of the cruciform shape of the body to positively position the sleeve structure 60 of the sliding relationship on the extent of the body 15. The sleeve structure is provided with a smaller end flange which is adapted to be positioned closest to the end cap of the mandrel which flange configuration will be the same size as the end cap for the smaller sized cartons. This surface is tapered as at 72 to facilitate positioning of the smaller cartons over the end of the smaller shoulder on the sleeve structure 60. [The sleeve structure under such conditions are adjusted along the extent of the body 15 and locked thereon such that the top flap portions of the carton blank will project beyond the sharp edge of the smaller shoulder flange and overlie the recessed portion 65 of the sleeve structure so that the top flaps may be infolded against the edge of the same.] The larger flange structure is similarly tapered as at 74 to facilitate entrance of the larger sized cartons thereon when a larger end cap such as 50 is used thereon. In addition to the bolt extending through the halves 62, 63 of the sleeve structure, a pair of fingers 75 are mounted on and secured to this enlarged shoulder portion of the sleeve structure to engage the ends of the smaller carton flaps, as shown in phantom in FIGURE 2, to facilitate in the forming [structure] thereof. [When larger carton sizes are utilized on the mandrel structure, they will project beyond the end of the sleeve structure 60 such that the top flap edge will project slightly beyond the end of the enlarged flange portion so that the top flaps may be creased on the ends of the sleeve structure 60. To facilitate infolding of the top flaps of the carton blank on the mandrel for large sized cartons, the] *The* base structure has a pair of larger fingers 85 positioned thereon and connected thereto through screws 86 with springs 87 therebetween to permit flexing of the fingers. [As the larger sized cartons are positioned on the mandrel and the sleeve structure is adjusted for the desired carton length, the fingers 85 will engage the infold flaps on the larger sized cartons to deflect the same and facilitate part of the forming or breaking structure of the top flaps of the carton during the carton forming operation.]

While the sleeve structure 60 as shown herein will accommodate carton sizes having two different cross-sections, it will be understood that the still larger sized cartons, as for example, the gallon size, will require a separate sleeve structure and end cap with cross-sectional dimensions to fit this size of carton. [The improved mandrel structure includes supporting plates base 16 of the mandrel to aid in the positioning of the fingers 85 thereon and to prevent translational movement of the same.]

In the improved mandrel structure, the removable end caps may be manually removed from the cylindrical end portions 24 of the body by overcoming the frictional connection caused by the friction ring 42 thereon. This readily facilitates a change in size of the mandrel structure for most of the varying sized cartons. In larger sizes the sleeve structure must also be changed. An appropriate sized end cap may be accurately positioned on the body 15 and the sleeve structure 60 adjusted translationally along the extent of the body in accord with indicia marked thereon and shown schematically at 90 to insure that the mandrel structure will fit and adequately position the carton blank for the carton forming operation. The [appropriate fingers 75 or 85 depending upon the carton size will engage the top flaps of the carton to position the same on the mandrel structure and the] exposed surfaces of the shoulder flanges on the sleeve structure 60 will provide a surface against which the top flaps of the carton may be pressed to break the carton along the seal lines thereof in the forming operation of the carton. The improved structure is readily disassembled by removal of the end caps 30 and parts 62, 63 of the sleeve structure to facilitate cleaning of the same. Similarly the finger structures 85 may be removed during the necessary maintenance for this type of machinery. The change over between carton sizes is readily facilitated by a simple adjustment and replacement of parts and the reduced mass of the structure permits cooling of the same to facilitate uniform temperatures in the carton forming operation.

*As noted above, the commercially-available plastic-coated paper cartons are made in only a limited number of cross-sections and the capacity of the cartons with the same cross-section is varied by varying the length of the carton. Thus, a quart carton has the same cross-section as the pint and half-pint cartons as well as several other less common sizes such as six-ounce and ten-ounce cartons, and the half-gallon carton has the same cross-section as for example the forty-ounce carton. There is however a distinction in the orientation of the folds at the top and the bottom of the carton of the quart-type and half-gallon type cartons that are being made and sold commercially, that is, with a half-gallon type carton, the infolded or gable flaps or panels at the bottom of the carton are on the same opposed faces of the carton as the infolded or gable flaps at the top of the carton, whereas on the quart-type carton, the infolded or gable flaps at the top of the carton are on the other two faces of the carton or in other words are arranged at ninety degrees to the folded flaps at the bottom of the carton.*

*The carton illustrated in FIGURE 2 is for example a pint carton which is a quart-type carton, that is, a carton having the same cross-section as a quart carton but differs therefrom in length. With all quart-type cartons, the carton blank is opened and inserted over the mandrel 10 with the flaps at the top of the carton arranged with the flat panels or flaps on the opposed sides of the mandrel having the fingers 75 and the gable flaps or panels on the intervening sides of the mandrel. The carton is inserted onto the mandrel until the ends of the flat flaps, which in the usual carton are slightly longer than the gable flaps, abut the adjacent surfaces of the large flange of the sleeve structure 60. As noted, the sleeve structure 60 will have been adjusted endwise of the body 15 so that, with the ends of the flat flaps in a stop position against the large flange, the fold lines between the bottom flaps and the body of the carton are aligned with the outer edges of the end cap 30 and are therefore adapted to be bent and formed over those edges to close and seal the bottom of the carton. The portions 65 of the halves 62 and 63 of the sleeve structure 60, which acts to interconnect the flanges at the ends thereof, are dimensioned relative to the top flaps of the carton so that when the flat top flaps are in stop position against the large flange, the fold lines between the top flaps and the body of the carton are aligned with the edge of the small flange that is remote from the end cap 30.*

*While the bottom flaps of the carton are closed and sealed on the carton forming machine, the top flaps are pre-broken, that is, they are bent on their fold lines so that they will take a set toward their closed position and will not normally thereafter lie in the plane of the adjacent side wall of the carton. Pre-breaking the top flaps of the carton is normally provided by a pair of machine elements in the form of fingers that move into engagement with the gabled top flaps and force them inwardly, which as they move in, pull the flat top flaps inwardly about their fold line. The grooved surfaces along the body 15 provide clearance for this infolding of the gabled top flaps and for this reason, the portions 65 are disposed as illustrated, that is, along the sides of the body 15 on which the fingers 75 are located and are sufficiently narrow, for example, have a width no greater than the width of the sides of the body 15, so that they will not interfere with the infolding of the gable flaps.*

*The portions 65 are, as shown, tapered inwardly from the small flange toward the large flange to provide clearance for infolding the flat top flaps of the carton about their fold lines at the edge of the small flange. Infolding the flat top flaps is provided by drawing them inwardly as the gable top flaps are infolded. The fingers 75 cooperate with the flat top flaps to grip the carton frictionally and thus hold it against being thrown off by centrifugal force as the mandrel is indexed rapidly from one position to the next.*

*The half-gallon type cartons are inserted over the mandrel with the position thereon on the mandrel being determined by a stop plate 88 against which the flat top flaps of the carton abut. The stop plate 88 is designed so that when the carton is in stop position, the fold lines between the bottom flaps and the body of the carton are aligned with the outer edges of the end cap 50. The sleeve structure 60 is at this time adjusted endwise of the body 15 to align the edge of the large flange that is remote from the end cap with the fold lines between the top flaps and the body of the carton.*

*The half-gallon type cartons are mounted on the mandrel with the bottom flaps oriented in the same manner as the bottom flaps of the quart type cartons so that they can be closed and sealed in the same manner and by the same mechanism as the bottom of the quart type cartons. Because of the way the cartons are made, the top flaps of the half-gallon type carton are thus in a position that is at ninety degrees from the position of the comparable top flaps of the quart type cartons, or in other words, as shown in FIGURE 1, it is the gable top flap and not the flat top flaps that on the side of the body 15 on which the fingers 75 and 85 are mounted. To pre-break the top flaps, the fingers 85 are arranged to engage the gable top flaps and to infold them as the carton is forced onto the mandrel. The grooved surfaces along the body 15 provide clearance for the infolded gable top flaps. Infolding the gable top flaps draws in the flat top flaps and thus bends them over the edge of the large flange of the sleeve structure 60. The machine elements for infolding the gable top flaps of the quart type cartons act on the flat top flaps of the half-gallon type carton. Inasmuch as the top flaps are beyond the flange structure 60, there is sufficient clearance for bending the flat top flaps inwardly.*

*The fingers 85 are resiliently mounted on the screws 86 to permit the same to be swung to an inoperative position and thus to provide clearance for the sleeve structure 60 when it is adjusted lengthwise of the body 15 to a position adjacent to the base 16, which is the position to which it is adjusted for forming quart cartons.*

In considering this invention it is intended that the present disclosure is to be considered as illustrative and the scope of the invention should be determined by the appended claims.

What is claimed is:

1. A mandrel for a carton forming machine comprising, an elongated body having an enlarged base portion adapted to be secured at the base portion to a machine upon which it is to be mounted, said elongated body being reduced in its cross-section dimension along its extent from the base portion and having grooves on opposite surfaces thereof, the extremity of the elongated body opposite the base portion having a cylinder tip with a grooved peripheral surface, a retaining ring positioned in said grooved peripheral surface, said body having an elongated slot extending between opposite surfaces and positioned in the grooves, an end cap having a cross-section adapted to match the cross-section of a carton blank which is to be formed into a carton on the mandrel with a cylindrical recess in one side of the end cap, said end cap being adapted to be removably positioned on the cylindrical tip of the body with the retaining ring frictionally engaging the surface of the cylindrical recess in the end cap to retain the end cap on the elongated body, sleeve means including a pair of symmetrical halves having raised shoulder flanges at the extremities which when the pair of halves are combined form at the shoulder flanges a cross-section symmetrical with the end cap, and bolt means positioned through an aperture in one of said halves and through the slot in the body being threaded into a tapped aperture in the other of said halves to mount the sleeve means on the reduced portion of the body so that one of the shoulder flanges and the end cap are adapted to support a carton blank during a carton forming operation.

2. The mandrel for a carton forming machine of claim 1 in which the shoulder flanges of the sleeve means are of different cross-sectional dimension and the halves fit around substantially half of the cross-sectional area of the body portion with the larger of the shoulder portions being positioned closest to the base portion and such that the sleeve means may be slidably moved on the elongated body toward and away from the end cap.

3. The mandrel for a carton forming machine of claim 2 and including finger means mounted on the base portion of the body and projecting toward the reduced cross-section of the body being adapted to engage flaps on a carton blank when mounted on the mandrel to deflect said flaps toward the reduced cross-section of the body.

4. The mandrel for a carton forming machine of claim 3 and including finger means mounted on the sleeve means adjacent the larger of the shoulder flanges and adapted to engage exposed flaps of a carton blank when the carton blank is mounted on the mandrel.

5. The mandrel for a carton forming machine of claim 4 in which the shoulder flanges and the end cap define a cross-sectional surface squared in form and in which one of the shoulder flanges and the end cap are of the same cross-sectional dimension.

6. The mandrel for a carton forming machine of claim 5 in which the elongated and reduced portion of the body is cruciform in cross-section and in which the symmetrical halves of the sleeve means have an internal configuration adapted to be slidably mounted on a reduced portion of the body.

7. [A mandrel for a carton forming machine comprising, an elongated body having an enlarged base portion adapted to be secured at the base portion to a machine upon which it is to be mounted, said elongated body being reduced in its cross-section dimension along its extent from the base portion and having grooves on opposite surfaces thereof, the cross section of the elongated body being generally cruciform in shape, the extremity of the elongated body opposite the base portion having a cylindrical tip with a grooved peripheral surface, a retaining ring positioned in said grooved peripheral surface, said body having an elongated slot extending between opposite surfaces and positioned in the grooves, and an end cap having a cross-section adapted to match the cross-section of a carton blank which is to be formed into a carton on the mandrel with a cylindrical recess in one side of the end cap, said end cap being adapted to be removably positioned on the cylindrical tip of the body with the retaining ring frictionally engaging the surface of the cylindrical recess in the end cap to retain the end cap on the elongated body, sleeve means including a pair of symmetrical halves having raised shoulder flanges at the extremities which when the pair of halves are combined form at the shoulder flanges a cross-section symmetrical with the end cap, the shoulder flanges of the sleeve means being of a different cross section and the halves being identical in construction and shaped to fit around the cruciform cross section of the elongated body with the larger of the shoulder flanges being positioned closest to the base portion and such that the sleeve means may be slidably moved along the elongated body toward and away from the end cap, bolt means positioned through an aperture in one of said halves and through the slot in the body being threaded into a tapped aperture in the other of said halves to mount the sleeve means on the reduced portion of the body so that one of the shoulder flanges and the end cap are adapted to support a carton blank during a carton forming operation, finger means mounted on the base portion of the body and projecting toward the reduced cross section of the body being adapted to engage the flaps on a carton blank when mounted on the mandrel to deflect said flaps towards the reduced cross section of the body, additional finger means mounted on the sleeve means adjacent the larger of the shoulder flanges and adapted to engage the exposed flaps of a carton blank when a carton blank is mounted on the mandrel, and] *The mandrel for a carton forming machine of claim 6 in which* the shoulder flanges of the combined sleeve means [having] *have a* tapered surface [s] and [a] reduced cross-section[al] dimension therebetween to permit folding of the top flaps of [the] *a* carton blank across the edges of the shoulder flanges.

8. A mandrel for a carton forming machine comprising, an elongated body member having a base portion with tapped apertures therein through which the mandrel is adapted to be secured to a machine upon which it to be mounted, the extremity of the body opposite the base portion having a reduced section with a mounting groove therein, a rubber ring positioned in the mounting groove, said body having symmetrically positioned guide surfaces along the extent of the same and a slot extending between opposite guide surfaces and through the body, multipart sleeve means having internal cooperating guide surfaces positioned on said body and including connecting means extending between the parts and through the slot in said body to hold the sleeve means slidably positioned on the body, said sleeve means having a pair of raised symmetrically shaped shoulder flanges at the extremities of the same of different cross-sectional dimension which are adapted to mount various sized carton blanks, and an end cap having a cross-sectional dimension adapted to mount a carton blank and symmetrical with one of the pair of shoulder flanges at the extremities of the sleeve means to cooperate therewith in mounting a carton blank, said end cap having a tapered recess therein adapted to fit over the reduced section of the body and frictionally engage the rubber ring thereon to position the end cap on the mandrel.

9. The mandrel of claim 8 and including means on the base and on the sleeve means for deflecting a portion of the top flaps of a carton blank inwardly as the blank is slidably positioned on the mandrel.

*10. A mandrel for a carton forming machine comprising, an elongated body, means for securing said body in an upstanding manner from a supported end on a machine upon which it is to be mounted, a pair of selectively used end caps both of which have a cross-section adapted to match the cross-section of a carton blank to be formed into a carton on the machine and one of which has a cross-section that is smaller than the other, and means for removably positioning a selected one of the end caps upon the extremity of the body and for holding the same against angular movement about the axis of the body, a sleeve structure including a pair of halves having raised shoulder flanges of different cross-sectional dimensions at the opposite ends thereof which when the halves are combined about the body form flanges comprising a first flange having a cross-section substantially symmetrical with the cross-section of the smaller one of said end caps and a second flange having a cross-section substantially symmetrical with the cross-section of the larger one of said end caps, and a portion interconnecting the shoulder flanges of each half, said interconnecting portions having a width no greater than the transverse dimension of the body and having a length to provide for pre-breaking over the edges of said first flange a carton having a cross-section corresponding to the cross-section of said first flange, and means for securing said sleeve structure in assembled relation on said body and in adjusted position endwise of the body and with said first and second flanges aligned angularly about the axis of said body with said end cap.*

*11. A mandrel in accordance with claim 10 in which said body has a substantially rectangular outline and*

*grooved surfaces on each of the faces thereof to provide a generally cruciform transverse cross-section, and said end cap and said flange structure being arranged on said body with the sides thereof disposed substantially parallel to the sides of the body.*

*12. A mandrel in accordance with claim 11 in which there is provided a pair of fingers mounted on said body and extending longitudinally thereof, said fingers being arranged in spaced relation to the body adjacent to the supported end and overhanging the body substantially centrally of a pair of opposed faces thereof whereby said fingers are adapted to engage and to infold the gable top flaps of a carton, and said interconnecting portions of said sleeve structure are disposed on the same sides of the body as said fingers.*

*13. A mandrel in accordance with claim 12 in which said interconnecting portions of said sleeve structure are tapered inwardly from said first flange toward said second flange, and the means for securing said sleeve structure comprises a bolt extending through one of said halves and threaded into the other of said halves, said bolt*

*extending through a slot formed centrally in and elongated endwise of the body.*

References Cited

The following references, cited by the Examiner, are of record in the patented file of this patent or the original patent.

UNITED STATES PATENTS

| | | | |
|---|---|---|---|
| 627,289 | 6/1899 | Bennett | 72—481 |
| 996,601 | 7/1911 | Ames | 72—478 |
| 1,037,372 | 9/1912 | Upton et al. | 93—51 |
| 3,196,760 | 7/1965 | Terry | 93—44.1 |
| 3,248,841 | 5/1966 | Heffelfinger | 93—44.1 XR |
| 3,285,283 | 11/1966 | Calvin | 285—321 XR |
| 3,301,144 | 1/1967 | Reeves | 93—49 X |
| 3,307,325 | 3/1967 | Garrett et al. | 93—44.1 XR |
| 3,382,775 | 5/1968 | Allen | 93—44.1 |

BERNARD STICKNEY, Primary Examiner